(12) United States Patent
Lester

(10) Patent No.: US 6,784,790 B1
(45) Date of Patent: Aug. 31, 2004

(54) SYNCHRONIZATION/REFERENCE PULSE-BASED POWERLINE PULSE POSITION MODULATED COMMUNICATION SYSTEM

(76) Inventor: Marshall E. Lester, Powerline Control Systems 19201 Parthenia St., Suite J, Northridge, CA (US) 91324

( * ) Notice: Subject to any disclaimer, the term of this patent is extended or adjusted under 35 U.S.C. 154(b) by 10 days.

(21) Appl. No.: 09/879,874

(22) Filed: Jun. 14, 2001

Related U.S. Application Data

(63) Continuation-in-part of application No. 09/656,160, filed on Sep. 6, 2000.

(51) Int. Cl.[7] .............................................. H04M 11/04
(52) U.S. Cl. ............................ 340/310.02; 340/310.01; 340/310.04; 340/310.08; 375/239; 375/259
(58) Field of Search ....................... 340/310.02, 310.03, 340/310.04, 310.01, 310.08, 310.06; 375/259, 239

(56) References Cited

U.S. PATENT DOCUMENTS

| | | | | |
|---|---|---|---|---|
| 4,264,960 A | * | 4/1981 | Gurr .......................... 700/295 |
| 4,328,482 A | * | 5/1982 | Belcher et al. ......... 340/310.02 |
| 4,398,178 A | * | 8/1983 | Russ et al. ............. 340/310.02 |
| 4,567,511 A | * | 1/1986 | Smith et al. ................... 725/14 |
| 4,658,241 A | * | 4/1987 | Torre ........................... 340/551 |
| 4,996,513 A | * | 2/1991 | Mak et al. ............. 340/310.04 |
| 5,005,187 A | * | 4/1991 | Thompson ................... 375/340 |
| 5,264,823 A | * | 11/1993 | Stevens ................. 340/310.04 |
| 5,614,811 A | * | 3/1997 | Sagalovich et al. ......... 323/207 |
| 5,691,691 A | * | 11/1997 | Merwin et al. ......... 340/310.02 |

* cited by examiner

*Primary Examiner*—Daniel J. Wu
*Assistant Examiner*—Son Tang
(74) *Attorney, Agent, or Firm*—Allan M. Shapiro

(57) ABSTRACT

A transmitting controller is connected to a powerline and on command places a reference signal and a series of signal pulses in the powerline at a series of signal timing positions related to zero voltage crossing points so that the signals pulses are substantially in the powerline temporal quiet zone. The receiving controller is connected to the powerline and has a filter circuit therein which filters away the powerline AC signal and noise to leave the reference and signal pulses. The signal pulses are compared to the position of starting reference pulses to determine in which signal timing position the pulses have occurred. Digital data is communicated over the powerline in accordance with the nature placement of the data pulses related to the reference pulse positions. The timing zone for transmission and signals is preferably about 500 to about 1000 microseconds away from zero voltage crossing.

40 Claims, 8 Drawing Sheets

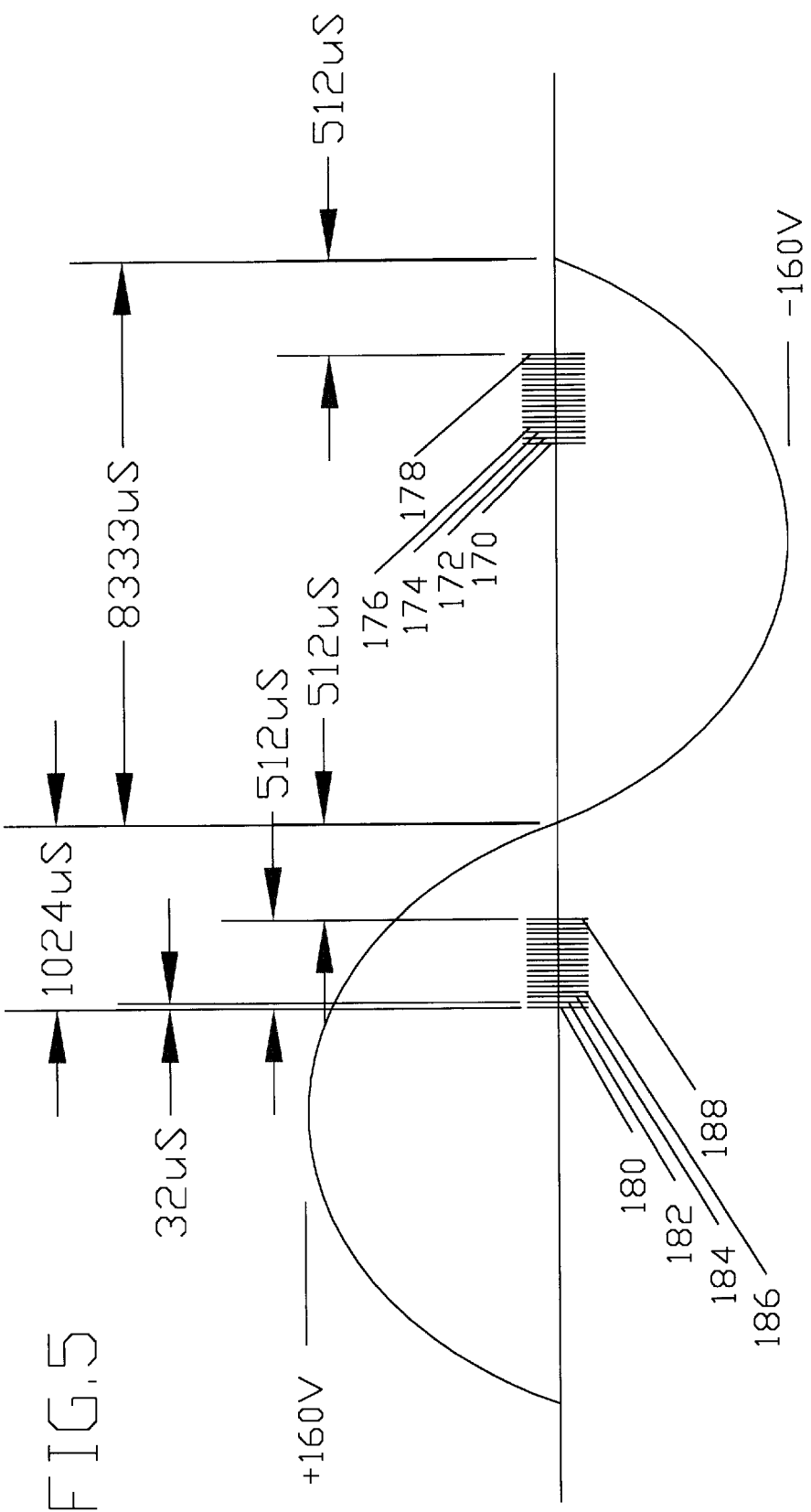

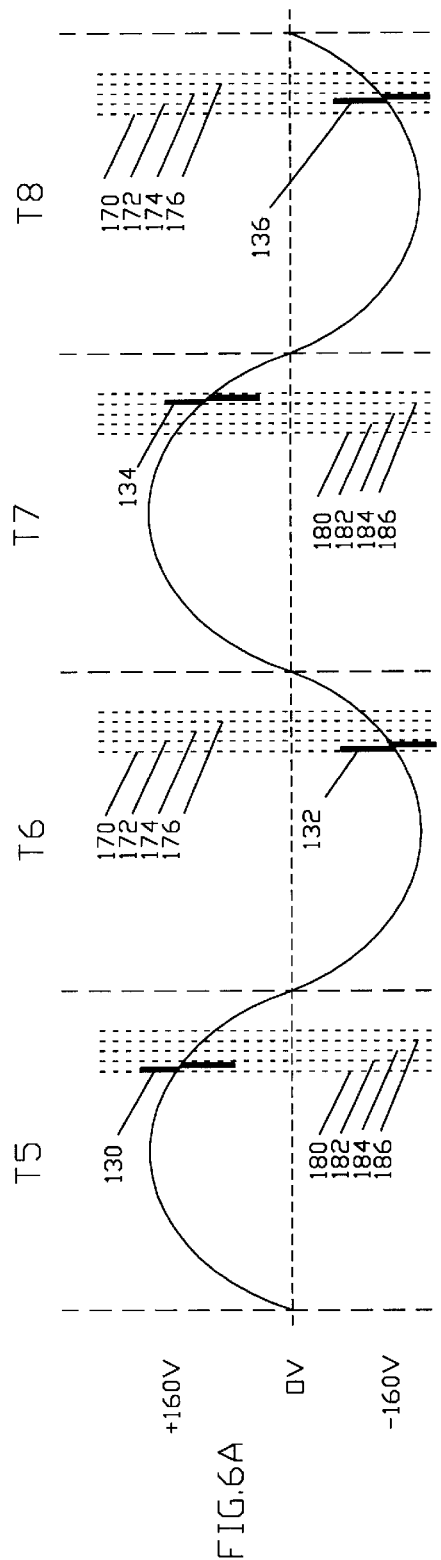
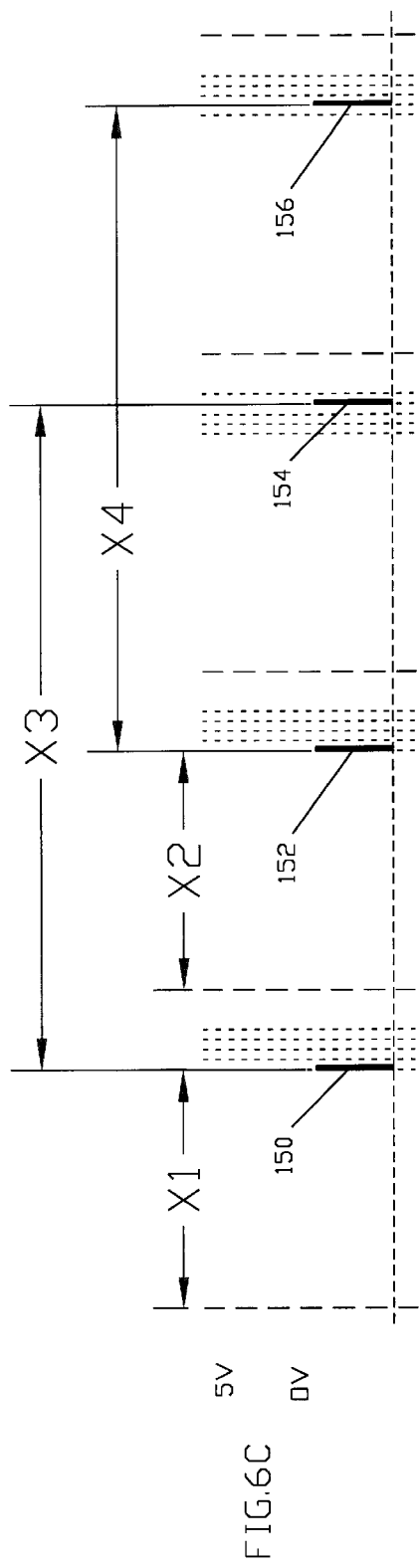
FIG.6A
FIG.6B
FIG.6C

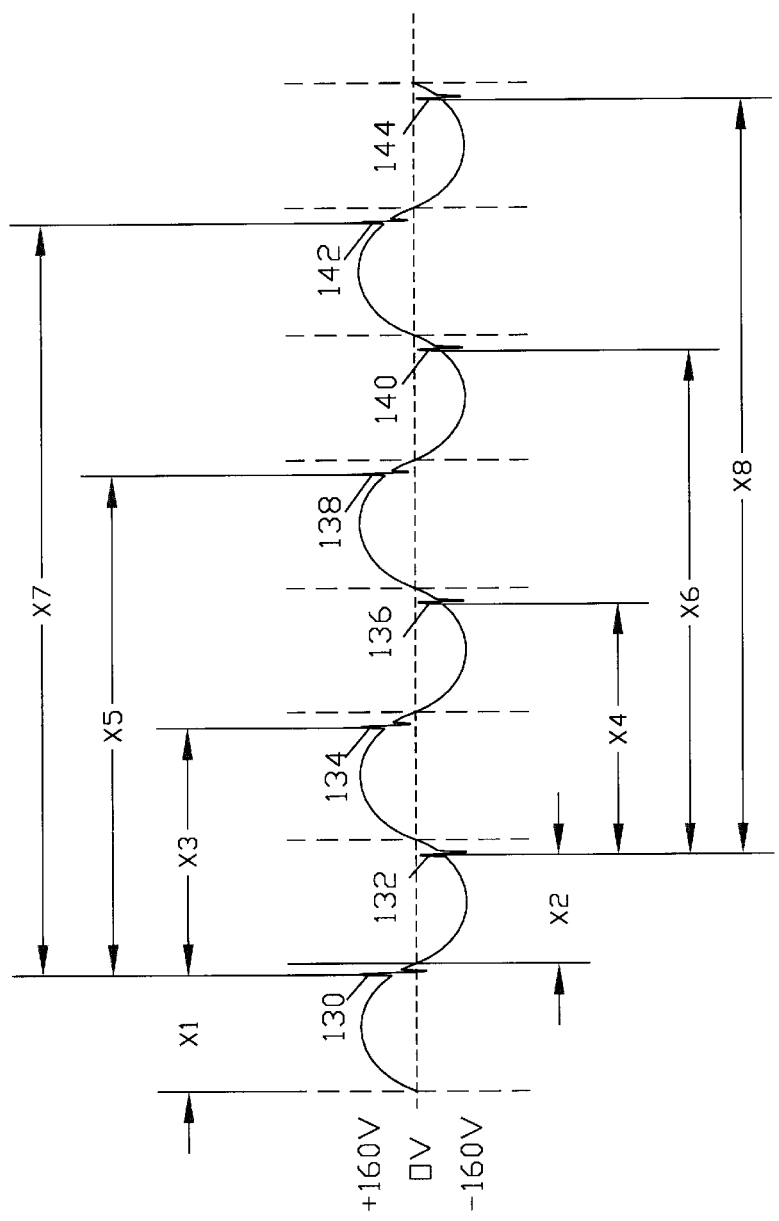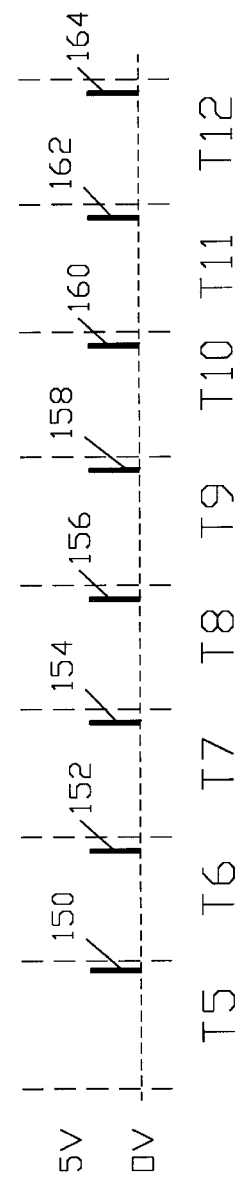
FIG.7
FIG.8

SYNCHRONIZATION/REFERENCE PULSE-BASED POWERLINE PULSE POSITION MODULATED COMMUNICATION SYSTEM

CROSS-REFERENCE

This invention is a continuation-in-part of my prior application Ser. No. 09/656,160 entitled "POWERLINE PULSE POSITION MODULATED COMMUNICATION APPARATUS AND METHOD", filed Sep. 6, 2000.

FIELD OF THE INVENTION

This invention is directed to an apparatus which enables digital communication between two or more devices wherein the devices are connected to the same powerline and use the same powerline to receive power and as a physical channel for electronic intercommunication.

BACKGROUND OF THE INVENTION

There are devices which are more conveniently used if they can be remotely controlled. In a household, such devices are mostly appliances and lighting loads. The appliances and lighting loads may be remotely controlled for a number of different reasons. For example, for night security, some lights may be controlled by a timer. In other cases, different lighting intensity and different lighting distribution may be desirable in a single room, depending upon its use. The room may be used for reading, conversation or watching displays, such as television. Each suggest a different lighting level and different lighting distribution. Normally, people do not make such changes because it is inconvenient to do so. Unless there is a convenient way to accomplish it, such adjustment of the lighting system is rarely done. Therefore, it is desirable to have a convenient, reliable way to remotely control lighting systems.

In addition to lighting systems, other devices can be conveniently remotely controlled. For example, powered gates and garage doors can be remotely controlled. An electric coffee pot may be turned on at an appropriate morning hour. Powered draperies may be opened and closed, depending upon sun altitude.

As electronic technology has advanced, inventors have produced a variety of control systems capable of controlling lighting and other electric loads. In order to be useful as a whole-house lighting control system, there are certain requirements that must be met. A system must permit both small and large groups of lights to be controlled on command. The problem is the connection between the controller and the lighting load. Such connection may be hard-wired, but such is complex and very expensive to retrofit into an existing home. Another connection system may operate at radio frequency, but this has proven difficult to implement because the FCC requires low signal levels which are subject to interference and because the transmission and receiving circuitry is complex and expensive.

It must be noted that both the controller and the load to be controlled are connected to the same powerline. It would be useful to use the powerline as the communication-connecting channel. Prior powerline communication schemes have had difficulties employing the powerline as a communication channel because the communication signals after being attenuated by the powerline circuitry are very small compared to the background noise. It is impossible to avoid the fact that between certain locations in a residence there will be very high attenuation of any transmitted signals. It has been difficult to reliably separate the highly attenuated communication signals from the background noise on the powerline.

The situation is further aggravated and complicated by the fact that the noise and attenuation parameters are constantly and unpredictably changing as loads are connected and disconnected both inside the primary residence and inside any of the many neighboring residences attached to the same mains power transformer. In reality the powerline circuit used for communication in a residence includes all the residences attached to the mains power transformer. There is no practical way to avoid the complications caused by this fact.

SUMMARY OF THE INVENTION

In order to aid in the understanding of this invention, it can be stated in essentially summary form that it is directed a powerline pulse position modulated communication apparatus and method. The transmitting portion of the apparatus senses the zero voltage crossing point in the powerline and transmits a series of signal pulses at a set of specified positions, the position of the data pulse relative to the starting reference pulses representing digital data in the form of a digital number. The set of all possible relative positions is in the quiet zone adjacent, but spaced from the main voltage zero crossing point. The receiving circuit also senses the voltage zero crossing point and can reliably detect the signal pulse in the background powerline noise because of the knowledge of where the signal pulse is expected in the quiet zone adjacent, but away from the zero crossing point and because of the high magnitude of the very robust signal pulse even after significant residential attenuation. After determining in which one of the possible relative positions the signal pulse was located, the associated digital data in the form of a digital number is easily determined. Thus digital data is communicated from one device through the powerline to another device using this method of powerline pulse position modulation.

It is a purpose and advantage of this invention to provide a method and apparatus for reliable communication of digital data over the powerline by means of a powerline pulse position modulation communication method.

It is a further purpose and advantage of this invention to provide a method and apparatus for powerline pulse communication wherein the voltage zero crossing is sensed and the communication signal pulse is transmitted and sensed in a receiver based on the signal position relative to the starting point of the previous pulse.

It is a further purpose and advantage of this invention to provide a method and apparatus by a powerline pulse position modulation communication method for the purpose of remote electrical load control.

It is a further purpose and advantage of this invention to provide a method and apparatus wherein the voltage zero crossing is sensed, and digital pulse windows are defined with respect to the zero voltage crossing, but spaced from the zero voltage crossing so as not to interfere with zero voltage crossing equipment.

It is a further purpose and advantage of this invention to provide a method and apparatus by a powerline pulse position modulation communication method for the purpose of remotely retrieving operational data from residential appliances.

It is a further purpose and advantage of this invention to provide a method and apparatus by a powerline pulse position modulation communication method for the purpose of remotely controlling residential loads for utility company energy management.

It is another purpose and advantage of this invention to provide a powerline pulse position modulated communication apparatus and method which complies with FCC regulations relating to apparatus which is connected to and communicating on the powerline.

The features of this invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 5 is a powerline waveform diagram showing the communication positions employed by the apparatus of this invention.

FIGS. 6A to 6C show the powerline waveforms and the associated communication positions related to zero voltage crossing, and show signals in some of the positions.

FIG. 7 shows the signal location in the powerline for a particular signal.

FIG. 8 shows the corresponding signal after it is extracted from the powerline wave.

DESCRIPTION OF THE PREFERRED EMBODIMENT

Figure 1:
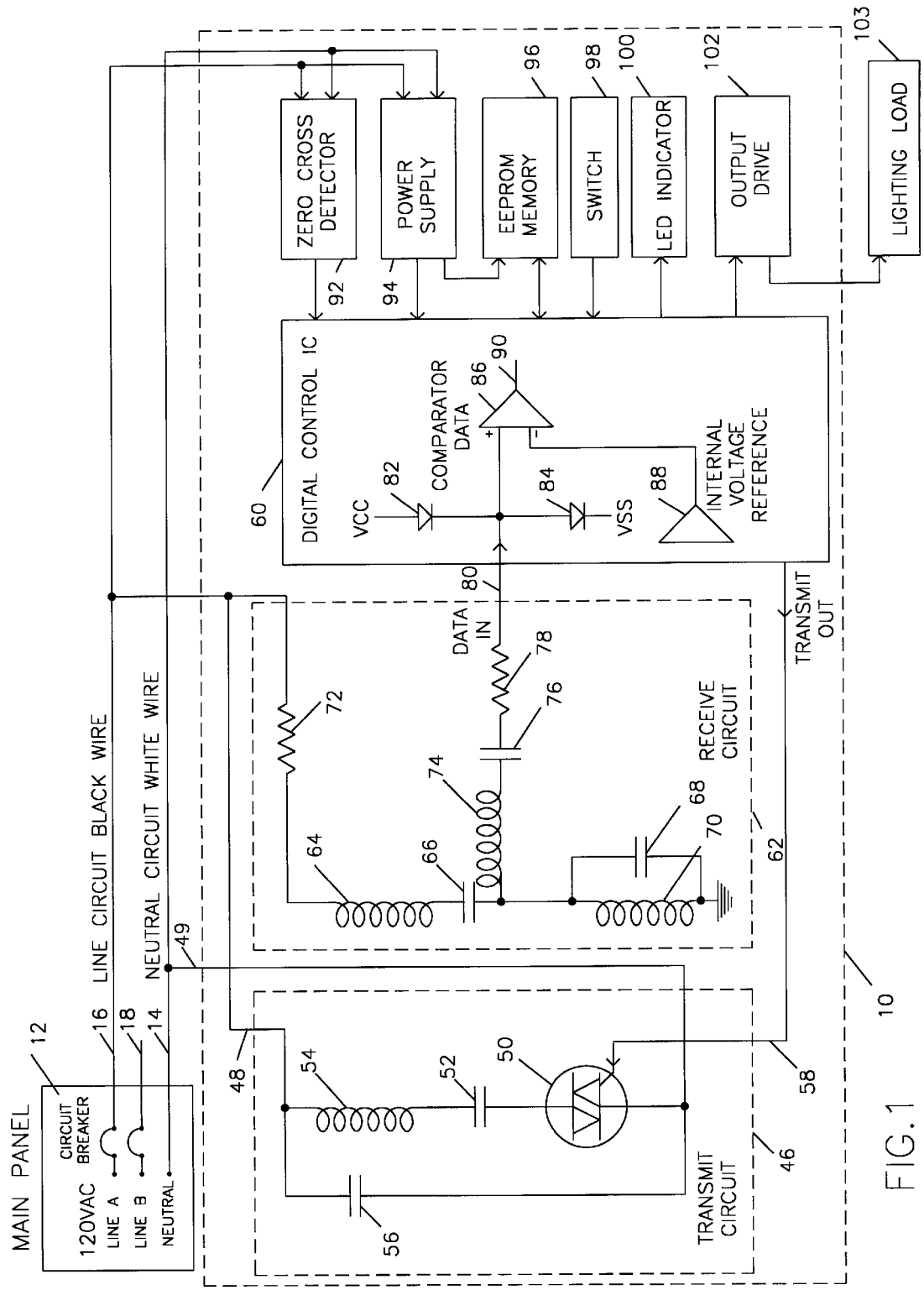
FIG. 1 is a schematic electrical diagram of the powerline pulse position modulated communication apparatus in accordance with this invention.

The purpose of the powerline pulse position modulated communication apparatus of this invention as shown in FIG. 1 is to enable the communication of digital data from one device to another by means of the powerline to which both devices are connected. A further purpose is to enable communication with appliances and to control lighting or other electrical loads in one or more rooms of a residence.

Application Example
Lighting Control System

Figure 2:
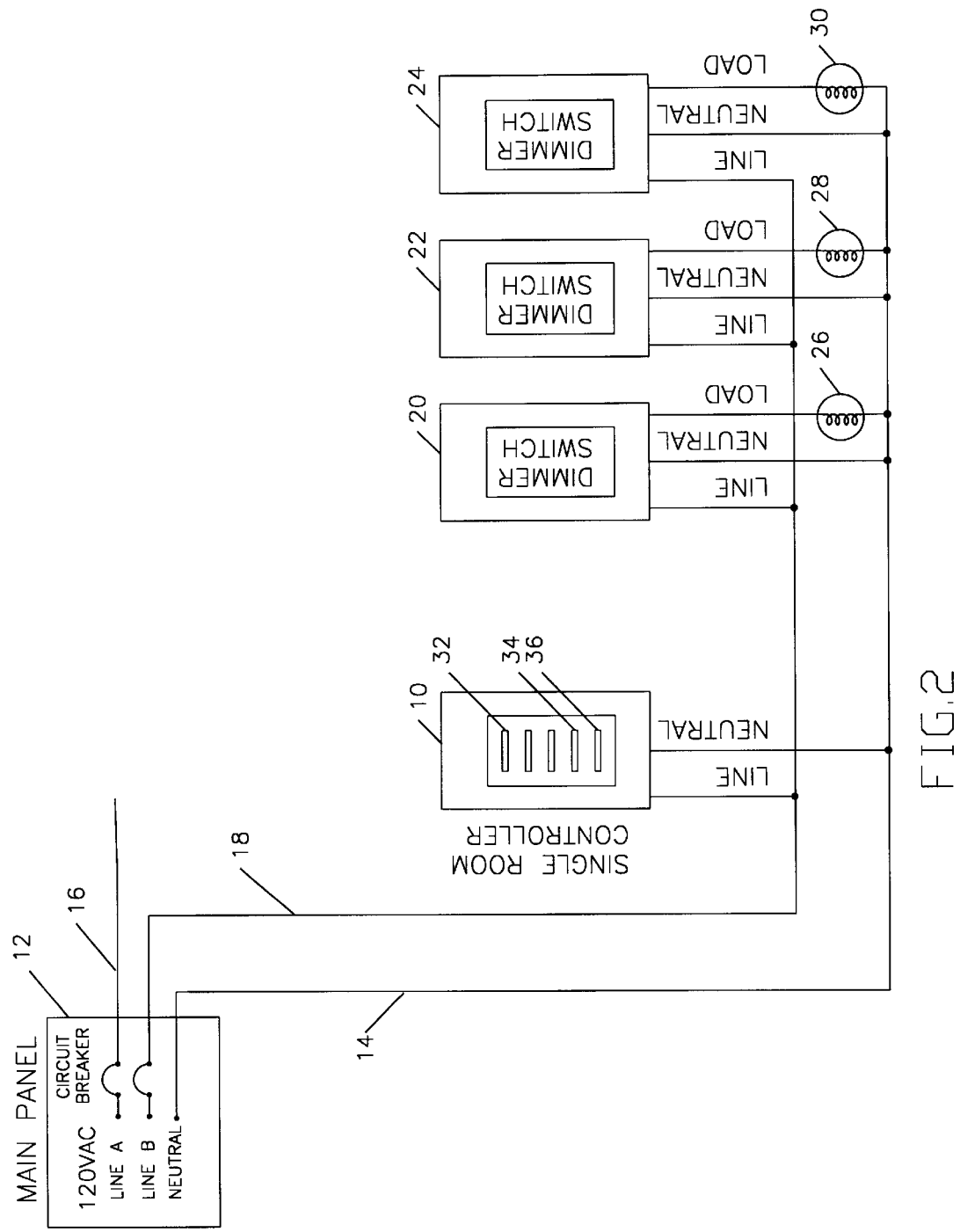
FIG. 2 is a schematic electrical diagram of how a plurality of such apparatus is used to control plural lighting loads in a room.
Figure 3:
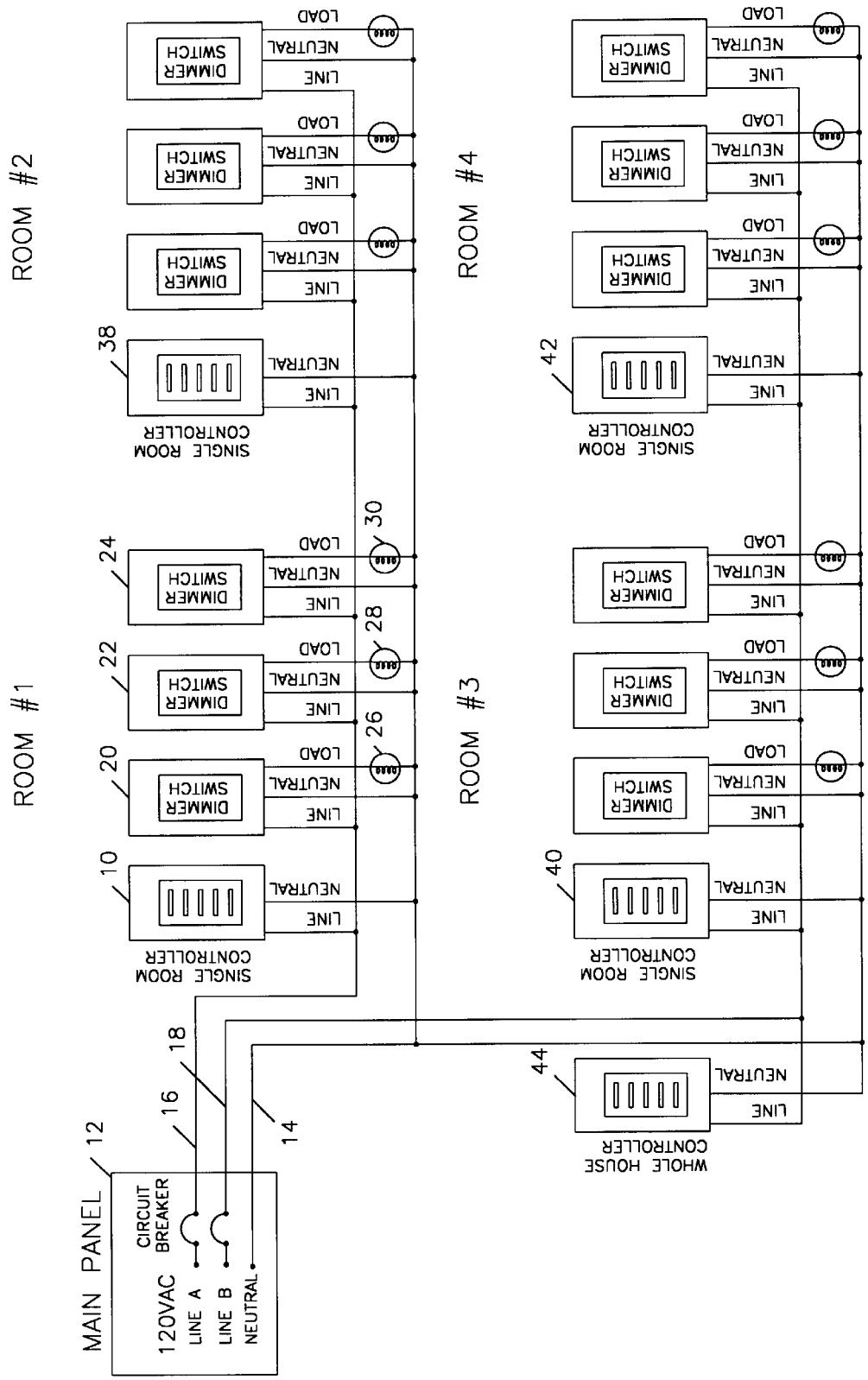
FIG. 3 is a schematic electrical diagram of how a plurality of such apparatus is used to control the lighting load in a plurality of rooms.

A lighting control system as shown in FIG. 2 and FIG. 3 will be used as an example of an application in this description of this invention.

In FIG. 2, transmitting controller 10 is supplied with conventional household electric power from circuit panel 12. Circuit panel 12 is supplied from commercial powerline and has two or three outputs. In the present example, the circuit panel 12 has a neutral line 14 and powerlines 16 and 18. Further, the powerlines 16 and 18 inside a domestic residence are derived from a center tapped 240 vac transformer and are each nominally at 120rms volts with respect to neutral line 14. The voltage waves in powerlines 16 and 18 are at a 180 degree phase angle with respect to each other.

Also connected to the powerline 18 and neutral 14 are lighting load receiving controllers 20, 22 and 24. These receiving controllers are respectively connected to loads 26, 28 and 30. The loads are electric lights, in this example, but may be heater or motor loads as described above. Furthermore, the receiving controllers 20, 22 and 24 are capable of receiving digital commands which change the supply of power to the loads and may supply different levels of power to the loads to control the brightness of the lighting load. The transmitting controller 10 emits its digital commands into the powerline 18 for transmission to the receiving controllers 20, 22 and 24 by pressing one or more of the command buttons 32, 34 and 36 on transmitting controller 10. Thus, the receiving controllers 20, 22 and 24 receive digital commands from the transmitting controller 10 to control the loads 26, 28 and 30, respectively. No separate wiring or radio frequency communication is required, but the transmitting controller places signals in the powerline 18. Such transmitted signals are coded so that they can be detected by all of the receiving controllers.

A similar arrangement is seen in FIG. 3 wherein a main circuit panel 12 supplies power to four different rooms. The lighting and other loads in the four different rooms can be separately controlled in each room or can be controlled by a master, whole-house controller 44. Assuming room No. 1 in FIG. 3 is the same as the room in FIG. 2, it is seen that room 2, room 3 and room 4 are identical. Each room has a transmitting controller the same as controller 10 and three receiving controllers, the same as controllers 20, 22 and 24. Each of the receiving controllers controls a load, the same as loads 26, 28 and 30, respectively. Each of the transmitting controllers 38, 40 and 42 is identical to the transmitting controller 10, and each places digital command signals into the powerline. However, the receiving controllers are programmed to act only on the relevant command data. The response of the receivers is determined by the preprogrammed address and command-interpreting program located within each receiver. Thus, the loads in four or more rooms may each be controlled by a transmitting controller.

In addition, transmitting master controller 44 is connected to the powerline. It is identical to the transmitting controllers 10, 38, 40 and 42, but it is programmed differently to send out digital data signals which command receiving controllers to control their loads individually. The fact that transmitting controller 44 is connected only between powerline 18 and neutral 14 does not interfere with its ability and function to send signals to receiving controllers connected between powerline 16 and neutral 14.

Transmission and Receiving Circuit Operation

The transmitting controllers 10 and the receiving controllers 20 are identical, in the sense that they contain the same transmitting and receiving circuitry. They are programmed differently so as to achieve the desired different results. The controller 10 is schematically illustrated in FIG. 1. It has a transmitting circuit 46, which is connected to powerline 16 through line 48 and to neutral through line 49. The transmitting circuit comprises triac 50 which is connected in series with energy storage capacitor 52. Inductor 54 is also in the series connection between line 48 and capacitor 52. Capacitor 56 forms a low pass filter with inductor 54 to minimize high frequency emissions so that the transmitter meets the FCC requirements. Triac 50 is controlled by line 58 which is the output from digital control integrated circuit 60. Hereinafter, the conventional abbreviation "IC" will be used in place of the term "integrated circuit." When the digital control IC sends an appropriate firing signal on line 58, the triac fires and puts a pulse in line 16 with respect to the neutral 14.

Controller 10 also contains a receiver circuit 62. The important components of the receiver circuit 62 form a band pass filter circuit. This includes capacitor 66, capacitor 68, capacitor 76, inductor 70, inductor 74 and inductor 64. Resistor 72 limits the current through the circuit. Resistor 78 is connected in series to limit the current in signal line 80. This circuit filters the signal pulse out of the powerline 60 cycle voltage and background noise.

Signal line 80 is connected into digital control IC 60 as its signal input. As a particular example, digital control IC 60 is a microprocessor Microchip model PIC16C622. The input signal line 80 is connected between two clipping diodes 82 and 84 to protect the digital control IC 60 from excessively high and low voltages. The signal input line 80 is connected to comparator 86 where the signal voltage is compared to internal voltage reference 88. The voltage reference 88, which is adjustable by the digital control IC 60 allows the digital control IC 60 to automatically adjust the receiving signal level to be set above the noise level. This is a form of automatic gain control which is essential so that the digital control IC 60 can discriminate between noise and real signal pulses. The comparator output 90 carries the received digital signal to the internal processing circuitry of the digital control IC.

There are additional inputs to the digital control IC 60. Zero crossing detector 92 is connected to powerline 16 and neutral 14. It has an output to the digital control IC 60. Power supply 94 supplies power to the digital control IC and to the EEPROM memory 96. There may be a plurality of the input switches, one of which is indicated at 98, for causing the digital control IC 60 to perform some internal operation or to issue transmitted commands. The commands of switch 98 correspond to the command buttons 32, 34 and 36 seen in FIG. 2. It is desirable that there be some method of visual feedback to the user for a variety of programming and control uses. This is provided by indicator light 100, which may be energized by the digital control IC 60. When the controller 10 is acting as a receiver load controller, it has an output circuit which controls the load. This output device 102 is in the form of a relay, triac, or the like. It controls the flow of power from line 16 to the load 104.

Pulse Position Modulation of Digital Data

Figure 4A:
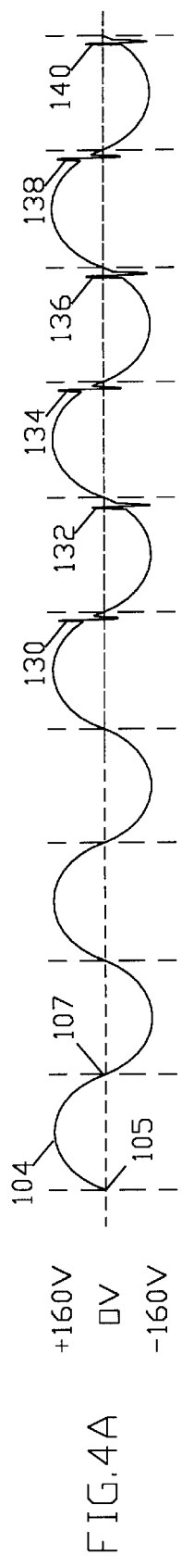
FIGS. 4A, 4B, 4C and 4D show the powerline waveforms containing the communication signals therein as utilized by this invention.
Figure 4B:
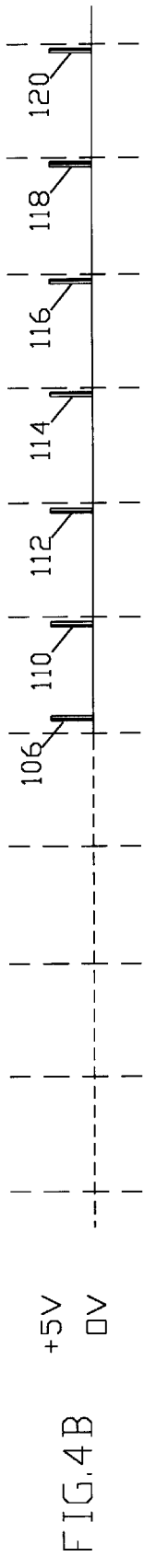

FIG. 4A shows a sine wave 104 which represents the powerline voltage in one of the lines 16 or 18 of FIG. 2, as compared to neutral. Ten half cycles are shown. For the purpose of this disclosure, the powerline frequency is 60 cycles per second, which is the modern domestic standard. The voltage shown is nominally 120 volts rms, with peaks at about 160 volts, plus and minus. These are examples, and the apparatus and method can be utilized with other voltages and frequencies. Taking 60 cycles per second as the preferred embodiment, each half cycle, which is each of the intervals T, in all figures, is 8.333 milliseconds.

Transmitter Operation

In FIG. 4A, the voltage through the time periods T1, T2, T3 and T4 is a plain sine wave 104 with no communication pulses. During the next six half cycles, T5 through T10, there is a superimposed pulse on the sine wave near to each of the positive and negative zero crossing points. One positive and one negative zero crossing point are indicated at 105 and 107 respectively. In FIGS. 4A, 4B, 4C and 4D, the zero crossing point is represented as the transition from one time period to the next. These superimposed pulses are the means of communication. The transmitting device places these pulses on the powerline. Receiving devices detect these pulses on the powerline.

In the current embodiment of the invention the first two pulses in any message are special reference pulses placed in predetermined fixed positions. These reference pulses do not encode any data. All following data pulses are referenced as to the reference pulse positions.

Each pulse after the first two synchronization pulses represents one transmitted data number. The number transmitted can range from 1 to N where N is the total number of possible positions of one pulse. In FIG. 5 a sine wave is shown with the sixteen positions highlighted in each half cycle. Positions number 0, 1, 2, 3 and 15 are identified on FIG. 5 as 180, 182, 184, 186 and 188, respectively. The current embodiment utilizes sixteen positions located in the quiet zone spaced from, but just before zero crossing. If the total time allotted to the 16 positions is 512 uS then the spacing of each position relative to the next possible position will be 32 uS. This is shown in FIG. 5. By placing a pulse in one of the possible sixteen positions, one numeric digit, from 0 to 15, or 0 to F in hex notation, can be transmitted every half cycle. In binary, this is equal to four bits per half cycle. Up to 256 positions are possible with current microprocessor technology. In binary, a number with 256 possible states is equal to eight bits or one byte per half cycle.

Figure 9:
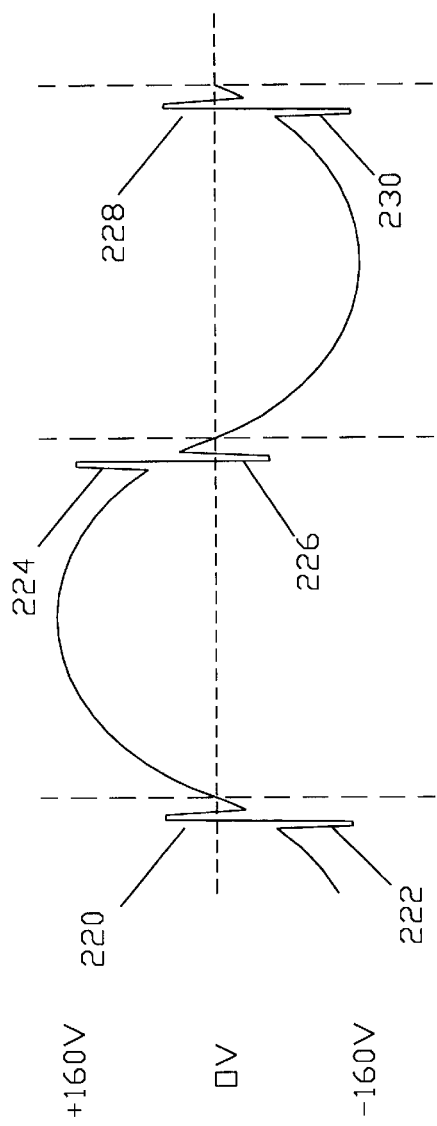
FIG. 9 shows Type A and Type B waveforms superimposed on the powerline voltage.

In order that the receiver may know the exact position of the signal pulses relative to the transmitter, a pair of start pulses or reference pulses is transmitted at the beginning of each series of data pulses, see FIG. 9. These two pulses will be referred to as reference pulses or Reference A and Reference B pulses. These reference pulses do not carry data but serve to establish a reference time for the determination of the position of the following data pulses.

Figure 10:
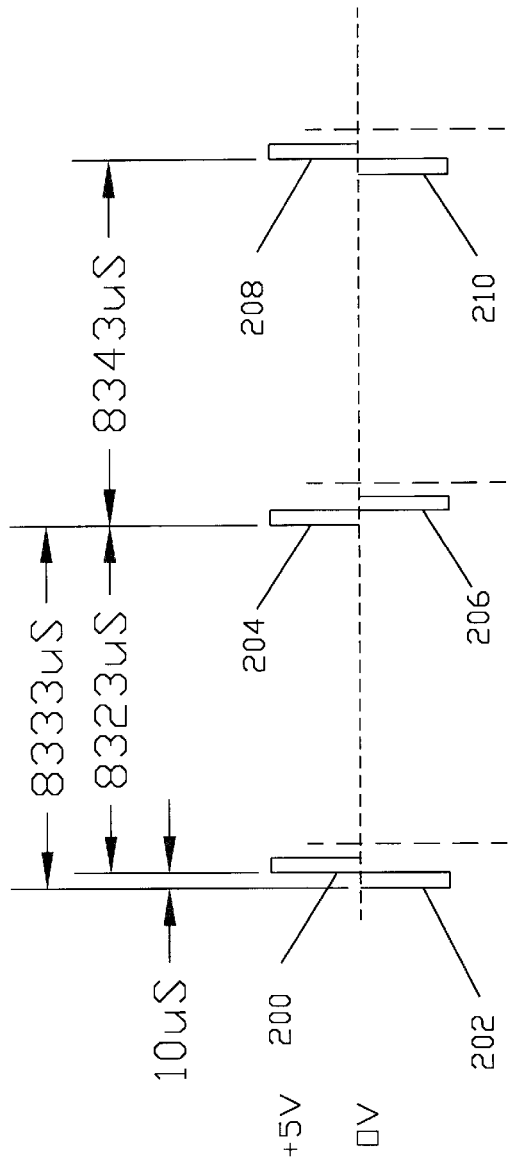
FIG. 10 shows the corresponding signal after it is extracted from the powerline wave.

The reason there are two reference pulses is that the pulses generated by discharging a positively charged capacitor appear differently to the receive circuit and digital control IC than the pulses generated by discharging a negatively charged capacitor. FIG. 9 shows pulses on the powerline voltage wave curve, and FIG. 10 shows the pulses after they are separated from the powerline. Pulse 224 in FIG. 9 is created by the capacitor discharging after being charged to +160v. This is why the first wave 224 appears to jump up and not down. Each individual pulse is made up of a first wave and second wave. The second wave 226 of the same pulse goes down. This is a phenomenon of the voltage and current ringing or oscillating as the capacitor discharges into the residence powerline circuitry. The pulse formed of the negative first wave 230 and positive second wave 228 is created by the capacitor discharging after being charged to −160v. This is why the first wave 230 appears to jump down and not up. The second wave of the same pulse shown as 228 goes up. There are actually several smaller waves produced in each pulse as the oscillations exponentially decrease to zero. For clarity only the two largest, two first waves are shown in FIG. 9.

Because the receive circuit only can sense positive voltage only, relative to ground, only the positive pulses such as 222, 224 and 228 can be sensed. An example is positive pulse 204 shown in FIG. 10. FIG. 10 shows the pulse signals in line 80 after going through the receive circuit. The receive circuit removes practically all of the 60 hz power waveform leaving only the communication pulses. The negative portion of this pulse shown at 206 cannot be sensed by the comparator. This is because the voltage reference that is the input to the comparator 86 in this design is powered by a positive voltage only. A more complex design could be made that uses both positive and negative voltage references but this would require a plus and minus power supply which would increase the cost of the design. This pulse at 224, 226, 204, and 206 is called a Type A pulse and if it is a Reference pulse it is called Reference A Pulse.

The same logic applies to pulses of Type B where the first wave 230 is negative and the second wave 228 is positive. Only the second wave 208 can be sensed by the comparator. This pulse at 228, 230, 208, and 210 is called a Type B pulse and if it is a Reference pulse it is called Reference B Pulse.

This phenomenon leads to the fact that on positive half cycles the receive circuit senses the first wave of a pulse, and on the negative half cycles the receive circuit senses the second wave of a pulse. The time difference caused by this phenomenon produces a fixed offset in the time of pulse arrival sensed by the digital control IC that is equal to the width of the first wave. Since this offset is stable and fixed it is very simple for the digital control IC to measure this difference and then compensate for it throughout the series of data pulses.

This phenomenon is shown as a 10uS difference in FIG. 10. The two reference pulses are transmitted by the transmitter at exactly 8333uS apart so that he receiver can measure the difference between the received pulses. This difference or offset remains the same throughout the transmission, appearing as a fixed offset on every other half cycle.

Figure 4C:
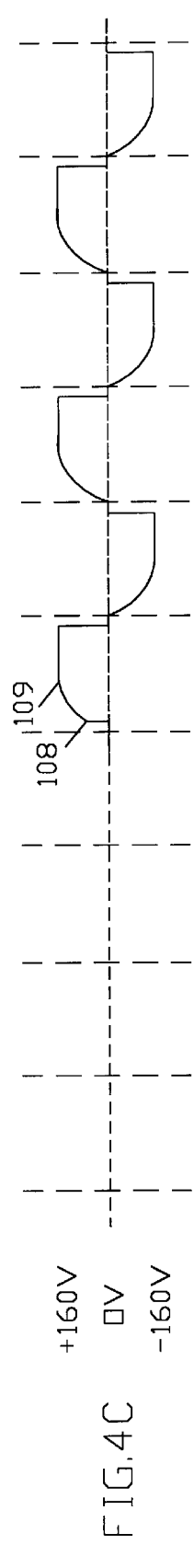
Figure 4D:
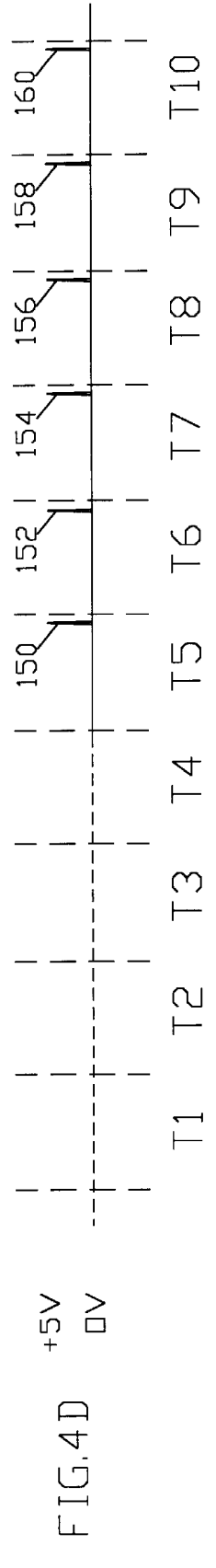

When a powerline pulse is desired, the first need is to charge the capacitor 52 in FIG. 1. Before the initial charging the initial charge state of the capacitor 52 is unknown. The digital control IC puts an initial trigger pulse 106, see FIG. 4B, in line 58 to begin charging triac 50. The initiating pulse is preferably near a zero crossing but is not critical. This turns on the triac 50, and the capacitor 52 begins charging. FIG. 4C shows the voltage across capacitor 52, and the start of its charging is shown at point 108. The curve in FIG. 4C after the point 108 is the traditional capacitor charging curve. This does not yet produce a pulse in the powerline. Once the triac 50 is conductive, another initiating trigger pulse is not necessary. Once the triac is charged and discharged in one half cycle, it will continue to charge in the opposite polarity and will be ready to discharge in the next half cycle, as seen in FIG. 4C. The triac turns off and the capacitor stops charging each time the charging current through the triac 50 reaches zero, which occurs at every peak of the mains sine wave, one of which is shown as 109 in FIG. 4C. When it is desired that a signal pulse be placed on the powerline, digital control IC 60 places a trigger pulse in line 58 to fire triac 50. These trigger pulses are shown at 110, 112, 114, 116, 118 and 120 in FIG. 4B. These pulses produce conduction in triac 50 to create corresponding signal pulses 130, 132, 134, 136 and 138 in the powerline, as shown in FIG. 4A. The waveform in FIG. 4C is shown as a reference of the voltage across transmitting capacitor 52 as it is charged and discharged. As it is discharged every half cycle, a pulse is produced in the powerline.

It is the position of the data pulse relative to the reference pulse, which determines what digit has been encoded in that pulse. In the example in FIG. 6 there are 16 possible positions every half cycle. For clarity only 5 of these positions are shown. Using programming numbering conventions the first four positions may be labeled Position #0, Position #1, Position #2 and Position #3. These positions are shown as 180, 182, 184, and 186 in FIG. 5 and FIG. 6. On the negative half cycle these positions are shown as 170, 172, 174, and 176.

Because only one pulse can be produced every half cycle, the pulse may be placed in only one of the sixteen positions. If there are 16 possible positions then one and only one of the digits 0 to 15 may be encoded by the position of the pulse. If the pulse is located in position #3 as shown as 134 cycle T7 in FIG. 6A, then the digit 3 is being transmitted. If the pulse is located in position #1 as shown at 136 in cycle T8 in FIG. 6A, then the digit 1 is being transmitted.

The two pulses 130 and 132 in cycles T5 and T6 are the reference pulses and are both located in position 0. Because they are used to establish the reference points for all following data pulses, there position is by definition position number 0.

Since only one pulse can be transmitted per half cycle with this circuit design, one and only one number can be transmitted each half cycle. The reason this method of modulating data is called "pulse position modulation" herein is because the value of the data is encoded in the position of the pulse.

Because of attenuation, background noise, and other periodic and intermittent random pulses present on the powerline, these signal pulses would ordinarily be difficult to detect. However, in accordance with this invention, when the pulse is located near the zero voltage crossing point for the power voltage wave, there is a quiet zone in the powerline voltage waveform in which the signal pulse can be more reliably detected. FIG. 5 shows two alternate half cycles of the normal 60 cycle sine wave. There are 8333 microseconds between zero crossings. The quiet zone close to each zero crossing is about 1000 microseconds long before and after the zero crossing. The total quiet zone is about 2000 microseconds long. Because the pulses may disturb certain zero crossing based devices we have chosen not to use the time after a time point starting from about 500 usec before zero crossing. This leaves a quite zone of about 500 usec starting from about 1024 usec before zero crossing and ending at about 512 usec before zero crossing. Dividing this quiet zone into sixteen positions defines eight positions, spaced 32 microseconds apart, located 512 usec before the zero crossing. The reliability of determining the position of each pulse is a function of how precise the transmitting and receiving timing can be accomplished. Smaller times will result in greater errors which results in lower overall reliability. While 16 positions are shown in FIG. 5, in actuality 256 positions are feasible with current IC technology. Signal positions 180, 182, 184, 186 and 188 are shown in FIG. 5. The same positions 180, 182, 184 and 186 are shown in FIG. 6A. In the example shown in FIG. 5 and FIG. 6, there are sixteen signal positions before each zero crossing. Present technology permits defining positions as small as 4 microseconds wide so that 256 positions can be defined near to each zero crossing.

To summarize, there are four primary reasons the area from 1000 uS to 500 uS before zero crossing is selected for our transmission period. First, because a relatively large pulse is generated because the capacitor is charged to a large voltage. Second, because there is a relatively uniform voltage from the beginning of this period to the end of this period. Third, because there is little interference caused by the communication pulses to devices that utilize the powerline zero crossing for various purposes, such as clocks or light dimmers. Fourth, because there is very little noise from pulse producing devices, such as light dimmers, during this period.

Receiver Operation

The manner of operation of this receiving circuit 62 in FIG. 1 has been discussed above. It is connected to the line and awaits the incoming pulse. The powerline frequency and noise are filtered out, but the signal pulse can readily be detected because it is within the 1000 microsecond quiet zone near the zero crossing point. When the pulse is sensed, the signal position in which it is located with respect to the previous pulse is determined by the Digital Control IC 60.

The two reference pulses, 150 and 152 and the first two data pulses 154 and 156 are seen in FIG. 6C. These correspond to the position with respect to the zero crossing as represented by the two reference pulses, 130 and 132 and the first two data pulses 134 and 136 on the powerline wave in FIG. 6A.

FIG. 6A illustrates two half cycles on the powerline sine wave. Reference pulse 130 is produced on the powerline sine wave at a time X1 after the zero crossing at 105 at the beginning of TS and before the zero crossing at the beginning of T6, and this results in a sensed signal 150 in the receiving circuit. Reference pulse 152 is sensed at a time X2 after the second zero crossing at 107. Data pulse 154 is sensed at a time X3 after the first reference pulse 152. Data pulse 156 is sensed at a time X4 after the second reference pulse.

FIG. 6B shows the zero crossing timing signal that is fed into the digital control IC by the zero crossing detector circuit 92 in FIG. 1. The transition of the signal in FIG. 6B from low to high at 105 or high to low at 107 marks the position of the zero crossing point to the digital control IC.

FIG. 6C shows the timing position of each of these pulses with respect to zero crossing and with respect to each other. These pulses are in line 80 into the digital control IC which compares their timing with respect to the signal received from the zero crossing detector 92.

These times, shown as X1 and X2, which are the positions of the two starting reference pulses, are placed at the beginning of the quiet zone and define for the following data pulses the reference position. The reference pulse 150 is timed from the previous zero crossing 105 and is set to be about 1024 microseconds before the next zero crossing 107. Since it is not desired to use the about 500 microseconds before zero crossing 107, that space is left free of signals.

These times, shown as X3 and X4 in FIG. 6C, can be processed to determine at which one of the sixteen possible different positions the data pulse was located. Each consecutive half cycle passes the position containing the signal pulse as determined by the receiving digital control IC. As the position is determined, the appropriate decoded numerical digit is also determined. Each one of the time measurements, X3 and X4, are translated into a digit from 0 to 15 by the digital control IC. As shown in FIG. 6C, the value of X3 can be used by the digital control IC to calculate that the pulse 134 is in position #3. Similarly, as shown in FIG. 6C, the value of X4 can be used by the digital control IC to calculate that the pulse 136 is in position #1.

In FIG. 7 a series of six numbers are being transmitted. The first two pulses 130 and 132 are the references pulses where 130 is the Type A reference pulse, derived from the positive half cycle and 132 is the Type B reference pulse derived from the negative half cycle. The data derived from the following three positive pulses, 134, 138, and 142 is referenced to the position which is determined from the three time periods respectively X3, X5 and X7. The data derived from the following three negative pulses, 136, 140 and 144 is referenced to the position which is determined from the three time periods respectively X4, X6 and X8.

The method of calculating the data from the time period after which a data pulse follows a reference pulse is very straightforward. For example the pulse 142 follows the reference pulse 130 by the time X7. If the reference pulse 130 is in data position 0 then the data encoded in pulse 142 is (X7−3*16666 msec)/32 msec. This is assuming the data positions are each 32 msec wide.

This is the fundamental method of transmitting and receiving numerical data. This series of numerical data is stored in the Digital control IC and processed according to the application program requirements. If the device is a lighting controller, the data would most likely represent lighting system addresses and command instructions. Other applications would have other meanings for the decoded data. Some application devices such as a powerline modem might use the invention for pure communication of data and may not have a specific application function.

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A powerline pulse position modulated communication transmitter comprising:

first and second connections for connecting to an AC powerline;

a chargeable capacitor and a switch in series therewith coupled to said first and second connections for connection in parallel to the powerline;

a digital control integrated circuit;

a zero voltage crossing detector circuit coupled to said first and second connections and to said digital control integrated circuit;

a signal source to actuate said digital control integrated circuit, said digital control integrated circuit being coupled to said switch in series with said capacitor to actuate said switch in a series of half cycles of the AC powerline in order to produce a series of pulses in said series of half cycles;

said pulses comprising at least one preliminary synchronization reference pulse referenced to the zero crossing time followed at least one half cycle later by one or more data pulses which are within about 1,000 microseconds of a following zero crossing in which each data pulse encodes a binary number determined by the relative position of said data pulse to said preliminary synchronization reference pulse;

said digital control integrated circuit being coupled to said switch in series with said capacitor to actuate said switch in one of a predetermined number of a plurality of signal time positions referenced to said reference pulse position in the powerline to discharge said capacitor into the powerline to produce a data pulse in the powerline at said one of said signal time positions.

2. The powerline pulse position modulated communication transmitter of claim 1 wherein there is a memory connected to said digital control integrated circuit, said memory being organized to cause said digital control integrated circuit to provide an appropriate series of said signal pulses representing digitally encoded data in response to said signal source to actuate said digital control integrated circuit.

3. The powerline pulse position modulated communication transmitter of claim 1 wherein said switch in series with said capacitor is a triac and said triac is connected to be actuated by said transmitting digital control integrated circuit so that said triac permits charging of said capacitor in either polarity of the powerline.

4. The powerline pulse position modulated communication transmitter of claim 3 wherein said digital control integrated circuit is programmed to actuate said triac to permit charging of said capacitor before signal pulses are desired, in order to have a charge on said capacitor when an actuating pulse actuates said triac to cause a signal pulse in the powerline in a selected signal position.

5. The powerline pulse position modulated communication transmitter of claim 1 wherein said digital control integrated circuit senses voltage zero crossing in the powerline and emits actuating pulses to said switch to cause one or more reference pulses at timing positions within a predetermined time range within the quiet zone prior to the zero crossing time.

6. The powerline pulse position modulated communication transmitter of claim 5 wherein said digital control integrated circuit reference pulse positions in the powerline and emits actuating pulses to said switch to cause one or more data pulses at timing positions within a predetermined time range prior to the zero crossing time.

7. The powerline pulse position modulated communication transmitter of claim 6 wherein there are at least four signal timing positions prior to zero crossing.

8. The powerline pulse position modulated communication transmitter of claim 1 wherein said transmitter is one of two controller parts of a system, both said controller parts being connectable to the same powerline for communication therebetween on the powerline, said system comprising two controllers, one acting as said transmitting controller and the other acting as a receiving controller, each said transmitting controller and said receiving controller respectively containing a transmitting digital control integrated circuit and a receiving digital control integrated circuit and each having a zero voltage crossing detector circuit connected thereto, and each said controller having both a transmitting circuit and a receiving circuit so that either said controller can act as a transmitting controller or as a receiving controller, utilizing the same digital control integrated circuit.

9. The powerline pulse position modulated communication system of claim 8 wherein each said controller has a transmitting circuit comprised of a triac serially connected to a capacitor, said serially connected triac and capacitor being coupled to the powerline, said triac being coupled to be controlled by said digital control integrated circuit; and each said apparatus having a receive circuit comprising a filter circuit for connection to the powerline, said filter having an output signal line connected to said digital control integrated circuit so that said digital control integrated circuit can detect the timing of a signal pulse with respect to the zero voltage crossing.

10. The powerline pulse position modulated communication system of claim 9 wherein a memory is connected to said digital control integrated circuit, said memory being programmed to define signal timing positions prior to and spaced from zero crossing so that said transmitting digital control integrated circuit can transmit a one or more reference pulses to the powerline at a selected signal timing positions when acting as a transmitter, and said receiving digital control integrated circuit can determine at which signal timing position a reference signal pulse occurs when said apparatus is acting as a receiving controller.

11. The powerline pulse position modulated communication system of claim 9 wherein a memory is connected to said digital control integrated circuit, said memory being programmed to define signal timing positions prior to and spaced from zero crossing so that said transmitting digital control integrated circuit can transmit a one or more data pulses to the powerline at a selected signal timing positions related to the position of said reference pulses in when acting as a transmitter, and said receiving digital control integrated circuit can determine at which signal timing position a data signal pulse occurs relative to said reference pulse when said apparatus is acting as a receiving controller.

12. The powerline pulse position modulated communication system of claim 1 wherein there is an output driver connected to said digital control integrated circuit, said output driver being connectable to a load so that said output driver can be actuated to energize the load.

13. A powerline pulse position modulated communication system comprising:

a transmitter, first and second connections for connecting said transmitter to an AC powerline, said transmitter having a zero voltage crossing detector connected to said connections, said transmitter having a circuit for producing a pulse;

a signal source connected to said circuit to actuate said transmitter circuit so as to produce a reference pulse in the powerline at reference pulse position which is in one of a plurality of signal time positions relative to the zero crossing time and said signal source being actuated to produce a plurality of subsequent data pulses in one of said plurality of signal time positions away from zero crossing and within about 1000 microseconds of zero crossing prior to subsequent powerline zero crossings, said subsequent pulses being in selected signal time positions referenced to and following said reference pulse; and a receiver having first and second connections for connecting to the same AC powerline, a zero voltage crossing detector in said receiver connected to said first and second connections and a circuit responsive to a reference pulse so that subsequent pulses following the reference pulse in one of the signal time positions can be detected as a function of the time after the reference pulse.

14. A powerline pulse position modulated communication receiver comprising:

first and second connections for connecting to an AC powerline;

a digital control integrated circuit;

a filter circuit coupled to said first and second connections for filtering out power voltages and passing signal pulses, said digital control integrated circuit being connected to said filter circuit to receive signal a message composed of at least one synchronization/reference pulse followed by one or more data pulses passed by said filter circuit; and a zero voltage crossing detector circuit coupled to said first and second connections and to said digital control integrated circuit, said digital control integrated circuit being programmed to compare the timing of the data pulses to the timing of said synchronization/reference pulse to determine at which one of a plurality of signal timing positions the data pulse is in relative to said synchronization/reference pulse position, said digital control integrated circuit deriving an encoded digital data number from the position of said data pulse being located in said one of said plurality of possible said timing positions relative to said synchronization/reference pulse position.

15. The powerline pulse position modulated communication receiver of claim 14 wherein said digital control integrated circuit senses signal pulses only at predetermined timing positions within a predetermined time range close to the zero crossing time.

16. The powerline pulse position modulated communication receiver of claim 15 wherein there are at least four signal timing positions before but not at zero crossing.

17. The powerline pulse position modulated communication receiver of claim 14 wherein said apparatus is one of two parts of a system, both being connectable to the same powerline for communication therebetween on the powerline, said system comprising two of said apparatus, one acting as a transmitting controller and the other acting as a receiving controller, each said transmitting controller and each said receiving controller respectively containing a digital control integrated circuit which can be programmed to act as a transmitting digital control integrated circuit or a receiving digital control integrated circuit, each said apparatus having a zero voltage crossing detector circuit connected thereto, and each said apparatus having both a transmitting circuit and a receiving circuit so that either said apparatus can act as a transmitting controller or as a receiving controller, utilizing the same digital control integrated circuit.

18. The powerline pulse position modulated communication receiver of claim 14 wherein said received signal pulses are received by a circuit incorporating a means for automatically adjusting the receive detection voltage level to provide automatic gain control.

19. A powerline pulse communication apparatus comprising:
- a transmitting controller and a receiving controller, said transmitting controller and said receiving controller each having connections for connecting to an alternating current powerline;
- said transmitting controller having a zero voltage crossing detector circuit with connections for connecting to the alternating current powerline, said transmitting controller having a digital control integrated circuit therein, said zero voltage crossing detector circuit having an output connected to said digital control integrated circuit;
- a command input connected to said digital control integrated circuit so that when said command input is actuated said digital control integrated circuit emits a trigger signal;
- a serially connected switch and capacitor having connections for coupling to the alternating current power supply so that, when said switch is actuated, said capacitor is charged by the alternating current power supply, said switch being connected to receive at least one trigger signal from said digital control integrated circuit, said digital control integrated circuit being programmed so that the synchronization/reference pulse trigger signal is within a predetermined time period referenced to a prior zero crossing so that said capacitor is discharged and the synchronization/reference pulse is added to the powerline within said predetermined time period near to but spaced from a zero crossing time;
- said digital control integrated circuit being programmed so that the one or more data pulse trigger signals are produced within a predetermined time period so that said capacitor is discharged and at least one data pulse is added to the powerline within one of a plurality of time positions within said predetermined time period referenced to said prior synchronization/reference time position.

20. The powerline pulse communication apparatus of claim 19 wherein said digital control integrated circuit is programmed to turn on said switch at a time to produce a powerline synchronization/reference pulse at one of a plurality of predetermined temporal positions referenced to the zero voltage crossing point.

21. The powerline pulse communication apparatus of claim 19 wherein said digital control integrated circuit is programmed to turn on said switch at a time to produce the powerline data pulse at one of a plurality of predetermined temporal positions referenced to the synchronization/reference pulse position.

22. The powerline pulse communication apparatus of claim 20 wherein there are at least four temporal positions separately defined by said digital control integrated circuit within the quiet zone within about 1,000 to 500 microseconds of zero voltage crossing.

23. The powerline pulse communication apparatus of claim 22 wherein each of said temporal positions is approximately 32 microseconds apart.

24. The powerline pulse communication apparatus of claim 16 wherein said receiving controller also has a zero voltage crossing detector circuit and a receiving digital control integrated circuit, said zero voltage crossing detector circuit being connected to said receiving digital control integrated circuit;
- a filter circuit having connections for connection to the household powerlines to receive power signals and communication pulses superimposed therein by a transmitting controller, said filter circuit substantially filtering out all signals except any command pulse in the powerline, said filter circuit being connected to said receiving digital control integrated circuit, said receiving digital control integrated circuit being programmed to be sensitive only to signal pulses within a predetermined time period near to but spaced from zero crossing.

25. The powerline pulse communication apparatus of claim 24 wherein said receiving digital control integrated circuit is programmed to distinguish between different temporal positions within said predetermined time period near to but spaced from zero crossing.

26. The powerline pulse communication apparatus of claim 24 wherein said receiving digital control integrated circuit is programmed to distinguish between different temporal positions within said predetermined time period relative to the position of reference pulses.

27. The powerline pulse communication apparatus of claim 24 wherein there is an output controller connected to said receiving digital control integrated circuit and said output controller is for connection to the alternating current powerline and to an electrical load, said output controller turning on said load when said receiving digital control integrated circuit detects pulses in said powerline corresponding to a command to energize the load.

28. The powerline pulse communication apparatus of claim 21 wherein said transmitting digital control integrated circuit is programmed to turn on said switch at a time to produce the powerline pulse within one of several temporal positions near to zero voltage crossing.

29. The powerline pulse communication apparatus of claim 21 wherein there are at least four possible temporal positions separately defined by said processor within said predetermined time period near to zero crossing.

30. The powerline pulse communication apparatus of claim 25 wherein each of said temporal positions is approximately 32 microseconds apart.

31. A powerline pulse position modulated communication system comprising:
- a transmitter, first and second connections on said transmitter for connecting to an AC powerline, a zero voltage crossing detector connected to said connection, a circuit in said transmitter for producing a pulse to said connections for producing a pulse in the powerline, said circuit receiving zero voltage crossing information from said zero voltage crossing detector and creating at least one synchronization/reference pulse in the powerline in a quiet zone window which is positioned in a predetermined quiet time period near to zero voltage crossing but not at the zero crossing time, followed by at least one data pulse time referenced to said synchronization/reference pulse; and a receiver having first and second connections for connecting to the same AC powerline, a zero voltage crossing detector in said receiver and a circuit in said receiver connected to said first and second connections and to said zero voltage crossing detector, said circuit being conditioned by the zero voltage crossing detector to receive at least one synchronization/reference pulse from said transmitter through the powerline said synchronization/reference being positioned in a predetermined quiet time period near to zero voltage crossing but not at the zero crossing time;

said circuit being conditioned to receive subsequent data pulses from the powerline within the quiet zone which is positioned in a predetermined quiet time period near to zero voltage crossing but not at the zero crossing time; said subsequent data pulses being located at positions which are referenced to said synchronization/reference pulse position and not to the subsequent zero crossing times.

32. The powerline pulse position modulated communication system of claim 31 wherein said predetermined quiet time period is between about 500 microseconds and 1000 microseconds away from zero voltage crossing.

33. A powerline pulse position modulated communication method for remotely controlling a load, comprising the steps of:

providing a transmitting controller for connection to the powerline;

sensing zero voltage crossing in the powerline;

sensing a load control command and causing the discharging of a capacitor across the powerline and causing the transmission of a reference pulse related to the zero crossing sensing and the load control command;

causing the discharging of a capacitor across the powerline for causing transmission of a series of actuating data pulses related to the position of the reference pulse and the load control command;

sensing at a receiving controller the zero voltage crossing, sensing the reference pulse, sensing the data pulses and determining in which signal timing positions the data pulses are located as compared to position that the reference pulse occurred; and actuating the load depending upon in which signal timing positions the data pulses occurred.

34. The method of claim 33 wherein the discharging of the capacitor to place a pulse in the powerline is caused by actuating a triac to become conductive with the triac-actuating signal being produced by a transmitting controller digital control integrated circuit.

35. The method of claim 34 wherein the timing of the trigger pulses to the triac are related to the zero crossing times by discharging the capacitor at a series of signal positions adjacent zero crossing times which correspond to a command for load control.

36. The method of claim 34 wherein the timing of the trigger pulses to the triac are related to the reference pulse times by discharging the capacitor at a series of signal positions adjacent zero crossing times which correspond to a command for load control.

37. The method of claim 33 wherein the signal timing positions are between about 500 and 1000 microseconds away from the zero crossings of the powerline voltage.

38. The method of claim 36 wherein the signal timing positions are approximately 100 microseconds apart.

39. The method of claim 33 wherein the receiving controller filters the signal out of the powerline voltage adjacent the zero crossing where the powerline is substantially quiet and delivers a series of sensed signal pulses to the digital control integrated circuit which determines at which signal timing positions said series of pulses occurred.

40. The method of claim 39 wherein the sensing at which signal timing positions the series of pulses occurred is correlated with a load command to appropriately actuate a load.

* * * * *